US011322859B2

(12) United States Patent
Yagyu

(10) Patent No.: US 11,322,859 B2
(45) Date of Patent: May 3, 2022

(54) ELECTRONIC DEVICE AND INSULATION-DISPLACEMENT TERMINAL

(71) Applicant: DENSO CORPORATION, Kariya (JP)

(72) Inventor: Yuki Yagyu, Kariya (JP)

(73) Assignee: DENSO CORPORATION, Kariya (JP)

( * ) Notice: Subject to any disclaimer, the term of this patent is extended or adjusted under 35 U.S.C. 154(b) by 162 days.

(21) Appl. No.: 16/805,097

(22) Filed: Feb. 28, 2020

(65) Prior Publication Data

US 2020/0303843 A1  Sep. 24, 2020

(30) Foreign Application Priority Data

Mar. 19, 2019  (JP) .............................. JP2019-051067
Sep. 24, 2019  (JP) .............................. JP2019-172847

(51) Int. Cl.
*H01R 4/2433* (2018.01)
*H01R 4/2404* (2018.01)

(52) U.S. Cl.
CPC ......... *H01R 4/2433* (2013.01); *H01R 4/2404* (2013.01)

(58) Field of Classification Search
CPC ...... H01R 4/24; H01R 4/2404; H01R 4/2416; H01R 4/2433; H01R 4/2466; H01R 9/00; H01R 9/031; H01R 9/053; H01R 9/075; H01R 12/67; H01R 12/616; H01R 12/675; H01R 43/01; H01R 43/05
See application file for complete search history.

(56) References Cited

U.S. PATENT DOCUMENTS

| 3,854,114 | A | * | 12/1974 | Kloth | .................. | H01R 4/2425 |
| | | | | | | 439/398 |
| 3,937,549 | A | * | 2/1976 | Hughes | ................ | H01R 4/2462 |
| | | | | | | 439/401 |
| 3,955,873 | A | * | 5/1976 | Peterson | .............. | H01R 4/2458 |
| | | | | | | 439/401 |
| 5,030,136 | A | * | 7/1991 | Reinhardt | .............. | H01R 13/58 |
| | | | | | | 439/460 |

(Continued)

FOREIGN PATENT DOCUMENTS

JP   S63-143762 A   6/1988
JP   H11-329523 A   11/1999

*Primary Examiner* — Edwin A. Leon
*Assistant Examiner* — Milagros Jeancharles
(74) *Attorney, Agent, or Firm* — Posz Law Group, PLC

(57) ABSTRACT

An electronic device includes a connection unit having an electric wire and an insulation-displacement terminal. The electric wire includes a conductor and an insulation coating on an outer periphery of the conductor. The insulation-displacement terminal includes two beams facing each other in a first direction to define a slot, and receives the electric wire in the slot to have an electrical connection. The insulation-displacement terminal includes an introduction part defining an opening of the slot, a scrape part for scraping the insulation coating from the electric wire, and a fix part fixing the electric wire in order along a second direction from the opening to an innermost of the slot. The thickness of the scrape part gradually increases toward the second direction so that as the electric wire advances through the scrape part along the second direction the width of the conductor to be scraped gradually increases.

10 Claims, 12 Drawing Sheets

(56) References Cited

U.S. PATENT DOCUMENTS

| | | | |
|---|---|---|---|
| 6,682,362 B2 * | 1/2004 | Herrmann | H01R 4/2425 439/395 |
| 7,736,173 B2 * | 6/2010 | Chen | H01R 13/41 439/395 |
| 8,758,041 B2 | 6/2014 | Bishop et al. | |

* cited by examiner

ELECTRONIC DEVICE AND INSULATION-DISPLACEMENT TERMINAL

CROSS REFERENCE TO RELATED APPLICATIONS

The present application claims the benefit of priority from Japanese Patent Application No. 2019-51067 filed on Mar. 19, 2019 and Japanese Patent Application No. 2019-172847 filed on Sep. 24, 2019. The entire disclosure of the above applications are incorporated herein by reference.

TECHNICAL FIELD

The present disclosure relates to an electronic device in which an insulation-displacement terminal fixes an electric wire for an electrical connection and the insulation-displacement terminal.

BACKGROUND

In an electronic device, for example, a motor mounted on a vehicle such as an automobile, an insulation-displacement terminal is used for electrical connection between a winding of a stator and a control substrate. This type of insulation-displacement terminal may be provided by a metal part with the spring property having a plate shape and have beams defining a slot for fixing an electric wire. When the electric wire with an insulation coating is inserted into the slot, the insulation coating is scraped by the beams and a conductor of the electric wire is exposed. As the conductor is pressed by the beams, the electric connection between the electric wire and the insulation-displacement terminal is achieved.

SUMMARY

The present disclosure provides an electronic device. The connection unit includes an electric wire and an insulation-displacement terminal. The electric wire includes a conductor and an insulation coating on an outer periphery of the conductor. The insulation-displacement terminal includes two beams facing each other in a first direction to define a slot between the two beams, and receives the electric wire in the slot to have an electrical connection. The insulation-displacement terminal includes an introduction part defining an opening of the slot, a scrape part for scraping the insulation coating from the electric wire, and a fix part fixing the electric wire in order along a second direction from the opening to an innermost of the slot.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
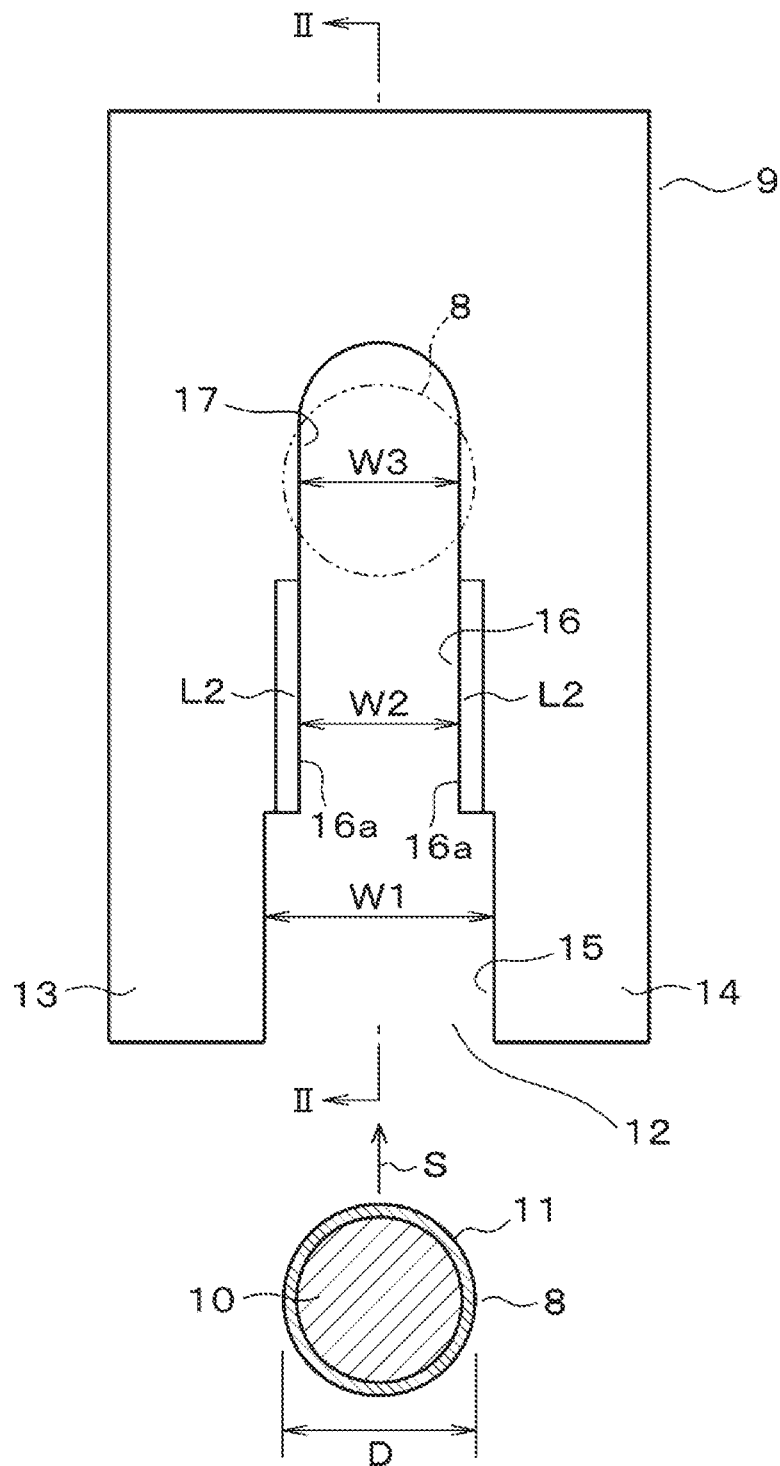
FIG. 1 shows a first embodiment, and is a front view schematically showing a configuration of a connection unit.
Figure 2:
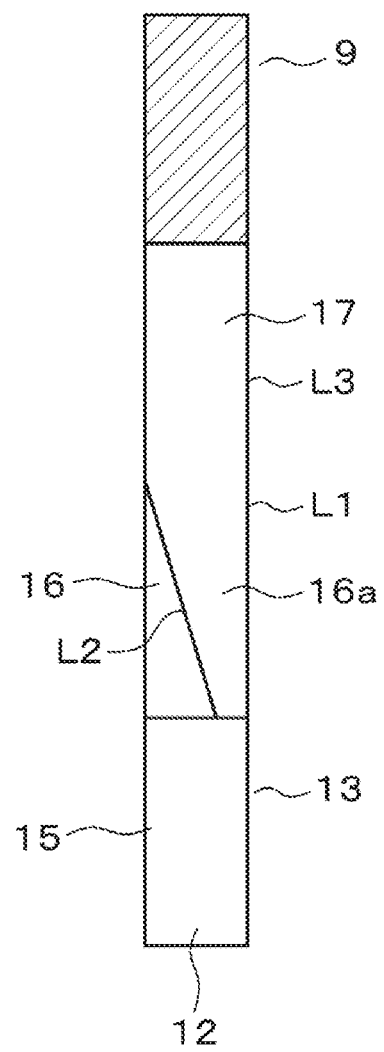
FIG. 2 is a cross-sectional view of a connection unit taken along line II-II in FIG. 1.

For example, when an electric wire is fixed to a slot of an insulation-displacement terminal, a part of a conductor is undesirably scraped together with an insulation coating. When a part of the conductor scraped from the electric wire becomes a cut piece and is separated from the conductor, there is a possibility that the cut piece falls on a peripheral electric circuit and exerts an electric influence.

The present disclosure provides an electronic device having an insulation-displacement terminal and an electric wire electrically connected to each other and reduces a separation and falling of a part of a conductor of the electric wire when the electric wire is fixed to a slot of the insulation-displacement terminal. The present disclosure also provides the insulation-displacement terminal.

An exemplary embodiment of the present disclosure provides an electronic device. An electronic device includes a connection unit. The connection unit includes an electric wire and an insulation-displacement terminal. The electric wire includes a conductor and an insulation coating on an outer periphery of the conductor. The insulation-displacement terminal includes two beams facing each other in a first direction to define a slot between the two beams, and receives the electric wire in the slot to have an electrical connection. The insulation-displacement terminal includes an introduction part defining an opening of the slot, a scrape part for scraping the insulation coating from the electric wire, and a fix part fixing the electric wire in order along a second direction from the opening to an innermost of the slot. A dimension of the slot in the first direction is greater at the introduction part than the scrape part and the fix part. The scrape part includes a contact portion on an inner surface of each of the two beams and to be in contact with the electric wire when the electric wire is inserted into the slot. The contact portion has a dimension in a third direction, which intersects with the first and second directions, gradually increasing in the second direction toward the innermost of the slot.

In the exemplary embodiment of the present disclosure, in the connection unit, the electric wire is inserted into the slot of the insulation-displacement terminal. The electric wire is fixed and electrically connected to the fix part by being fixed by the beams on both sides. In connecting the electric wire to the insulation-displacement terminal, the electric wire is inserted into the slot of the insulation-displacement terminal. First, the electric wire easily enters the slot from the introduction part. Second, the insulation coating of the electric wire is scraped by the scrape part. Then, the electric wire is fixed by being sandwiched by the fix part. As a result, a part of the electric wire in which the conductor is exposed contacts the insulation-displacement terminal. Thus, the insulation-displacement terminal is electrically connected to the electric wire.

When the electric wire passes through the scrape part, the insulation coating is scraped and a part of the conductor is also slightly scraped. The thickness of the contact portion on the inner surface of the scrape part gradually increases toward the second direction. Thus, as the electric wire relatively advances through the scrape part along the second direction, the width of the conductor to be scraped gradually increases, so that the cut piece widens in the third direction.

Thus, since the size of the part of the cut piece connected to the electric wire (conductor) gradually increases, the cut piece becomes difficult to be separated from the electric wire and be peeled off from the electric wire. As a result, in the configuration that the insulation-displacement terminal is electrically connected to the electric wire, when the slot of the insulation-displacement terminal fixes the electric wire, the configuration can reduce the separation and falling of the part of the conductor.

Hereinafter, some embodiments in which the present disclosure is applied to an in-vehicle motor as an electronic device will be described with reference to the drawings. The identical parts will be designated by the same reference numerals in the multiple embodiments, and a new drawing and repeated description will be omitted.

First Embodiment

Figure 4A:
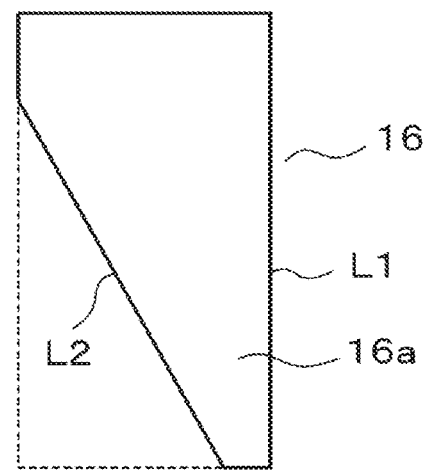
FIG. 4A is a side view showing the scrape part in one beam portion.
Figure 4B:
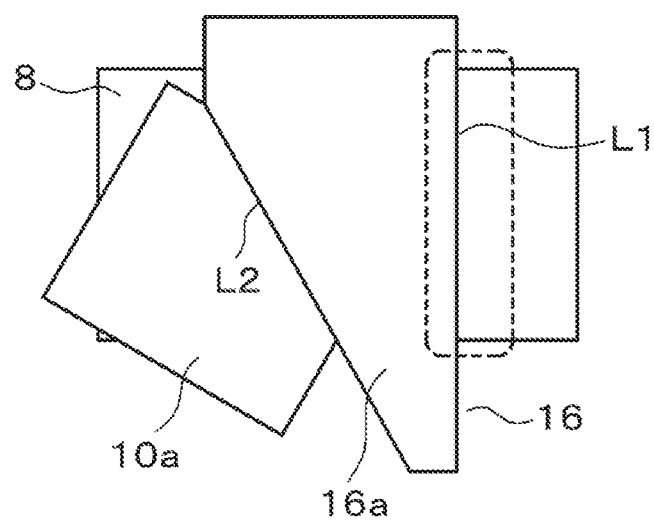
FIG. 4B is a diagram showing the scrape part generating a cut piece.
Figure 5:
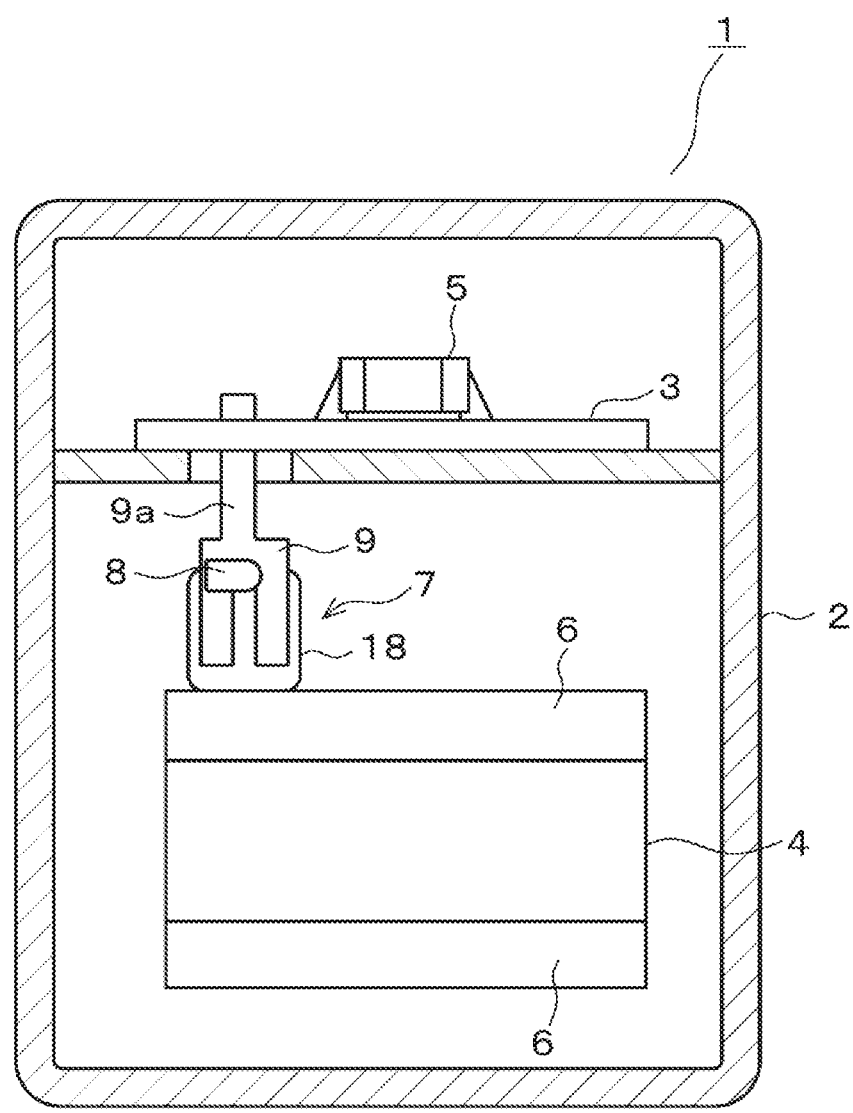
FIG. 5 is a cross-sectional view schematically showing a configuration of a motor.

A first embodiment will be described with reference to FIGS. 1 to 5. FIG. 5 schematically shows a configuration of a motor 1 as an electronic device according to the present embodiment. The motor 1 includes a housing 2. In FIG. 1, in the housing 2, the motor 1 has a control board 3 provided at an upper part and a stator 4 provided at a lower part. Although not shown in detail, on the control board 3, an electronic component 5 and an energization control circuit is mounted. The energization control circuit controls energization to the stator 4 (winding).

An insulator 6 is provided in the stator 4. On the insulator 6, a connection unit 7 is provided for electrically connecting the stator 4 (winding) and the control board 3. The connection unit 7 includes an electric wire 8 and an insulation-displacement terminal 9 that fixes the electric wire 8. Hereinafter, the electric wire 8 and the insulation-displacement terminal 9 included in the connection unit 7 will be described in detail with reference to FIGS. 1 to 4B.

As shown in FIG. 1, the electric wire 8 includes an insulation coating 11 made of synthetic resin on the outer periphery of a conductor 10. The conductor 10 may be formed of one thick metal wire rod. Alternatively, the conductor 10 may be formed by bundling fine wires. The electric wire 8 has a base end connected to the winding of the stator 4, and a front end fixed and fixed by the insulation-displacement terminal 9.

The insulation-displacement terminal 9 may be provided by a thin metal plate, such as copper or a copper alloy. The insulation-displacement terminal 9 may have a thickness of about 1 millimeter (mm). The insulation-displacement terminal 9 has a rectangular shape longer in an up and down direction in FIG. 1. The insulation-displacement terminal 9 has a slot 12 to which the electric wire 8 is to be fixed. The slot 12 is formed by beams 13, 14 which are provided by left and right parts of the insulation-displacement terminal 9 except for the upper part in FIG. 1, and face with each other in a first direction. The slot 12 is open at the lower side of the insulation-displacement terminal 9 of FIG. 1 and extends upward, that is, in a second direction. An inner end portion of the slot 12 has a rounded semicircular shape.

As shown in FIG. 1, the slot 12 has an introduction part 15, a scrape part 16, and a fix part 17 in this order along the second direction from the opening (the lower side in FIG. 1) to the innermost (the upper side in FIG. 1). The introduction part 15 has a wide shape in a left-right direction in FIG. 1. The introduction part 15 is wider than the scrape part 16 and the fix part 17 in the left-right direction. That is, a dimension of the slot 12 in the first direction is greater at the introduction part 15 than the scrape part 16 and the fix part 17. The introduction part 15 guides the electric wire 8. The scrape part 16 scrapes the insulation coating 11. The fix part 17 fixes the electric wire 8. The scrape part 16 is provided in each beam, and scrape parts 16 are in parallel. In the slot in the left-right direction of FIG. 1, the relationship among a dimension W1 of the introduction part 15, a dimension W2 of the scrape part 16, a dimension W3 of the fix part 17, and a dimension D of diameter of the electric wire 8 satisfies W1≥D>W2≥W3. The electric wire 8 is inserted into the slot 12 from the opening in the direction of the arrow S (a second direction). When the electric wire 8 passes through the scrape part 16, the insulation coating 11 is scraped. When the electric wire 8 is inserted in the fix part 17, the conductor 10 in which the insulation coating 11 has been scraped from the electric wire 8 contacts the both sides of the fix part 17. Thus, the conductor 10 is electrically connected to and fixed by the fix part 17.

As schematically shown in FIG. 5, the insulation-displacement terminal 9 is fixed by a holder 18 made of an insulating material and provided on the insulator 6. The insulation-displacement terminal 9 is inserted in the holder 18 from above with the opening of the slot 12 facing down. Although not shown, the electric wire 8 is arranged at the both sides of the insulation-displacement terminal 9 and fixed by a support portion. The insulation-displacement terminal 9 includes a connection unit 9a. The connection unit 9a has a narrower width in a left-right direction in FIG. 5. The connection unit 9a extends upward to the control board 3, and is electrically connected to the control board 3.

In the present embodiment, the scrape part 16 is configured as follows. In FIGS. 2 to 4B, one beam portion 13 is shown as a representative. The scrape part 16 includes a contact portion 16a at inner surfaces of the beams 13, 14 which provide the slot 12. The contact portion 16a contacts the electric wire 8 when the electric wire 8 is inserted. In a direction of the thickness of the insulation-displacement terminal 9 (a front-back direction of paper of FIG. 1, a third direction), the thickness of the contact portion 16a is gradually increased toward the second direction (upward in FIGS. 2 to 4B). The third direction intersects with the first and second directions. As shown in FIGS. 2 to 4B, the contact portion 16a includes an edge portion L1 on the rear surface, that is, one of the two edges in the third direction. The edge portion L1 extends linearly. The edge portion L1 is aligned with the rear surface of the insulation-displacement terminal 9. The edge portion L1 is also referred to as a first edge.

Figure 3:
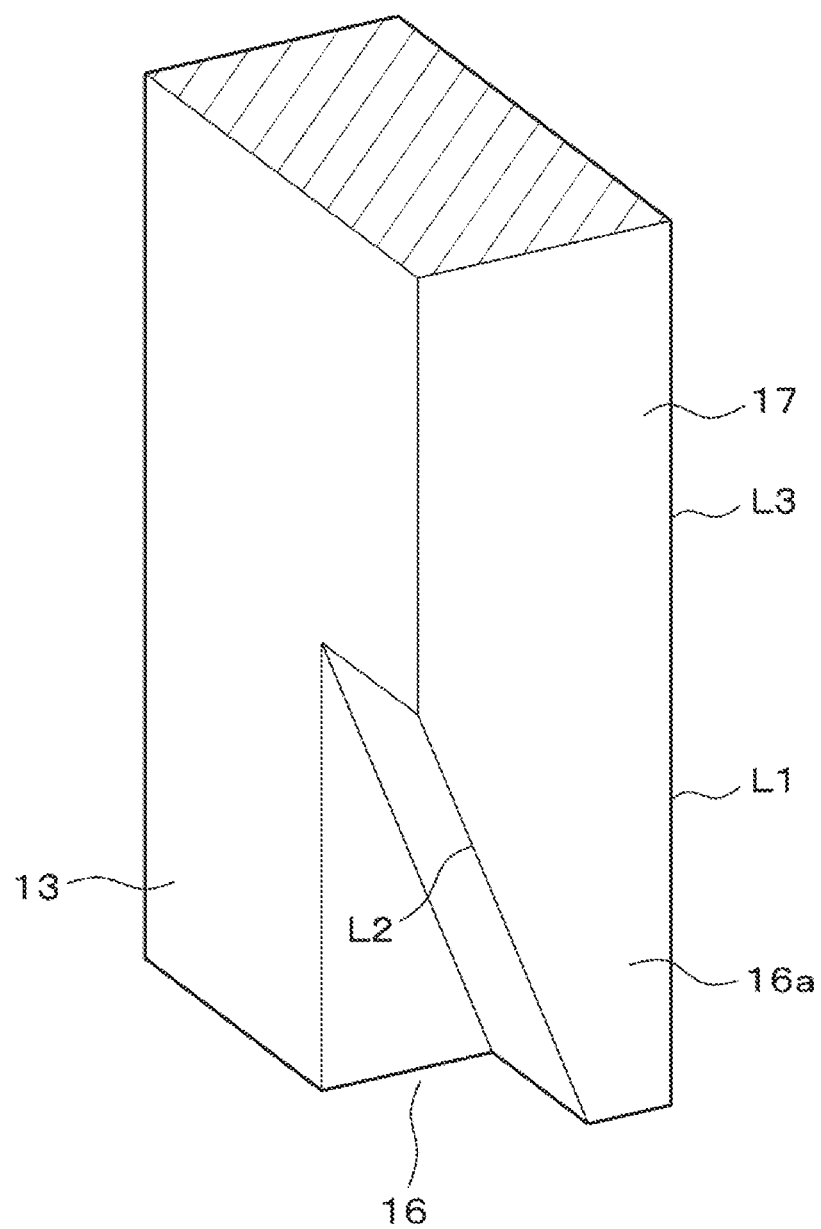
FIG. 3 is a perspective view showing a scrape part and a fix part in one beam portion.

The contact portion 16a includes an edge portion L2 on the front surface. The edge portion L2 is inclined with respect to the front surface of the insulation-displacement terminal 9. The contact portion 16a is provided as a convex portion having a trapezoidal shape. The edge portion L2 is also referred to as a second edge. As shown in FIG. 3, the edge portion L1 of the contact portion 16a is aligned with a rear edge portion L3 of the fix part 17. Not shown in figures in detail, the contact portion 16a is also formed symmetrically (mirror symmetry) on another inner surface of the beam portion 14, which is located in an opposite side of the beam portion 13. Therefore, in the contact portion 16a, the edge portions L1, which linearly extend and are aligned with the surface of one of the surface (rear surface) of the insulation-displacement terminal 9, are provided in both beams 13, 14 in the same side of the third direction.

Next, the operation and effect of the above configuration will be described. In the motor 1 of the present embodiment, the electric current for the stator 4 is controlled by the control board 3 by the connection unit 7 connecting the electric wire 8 and the insulation-displacement terminal 9. In connecting the electric wire 8 and the insulation-displacement terminal 9, as shown in FIG. 1, the electric wire 8 is inserted from the opening of the slot 12 to the innermost, that is, toward the direction of arrow S, and fixed by the both sides of the insulation-displacement terminal 9.

In the insertion, the electric wire 8 easily enters the slot 12 by the introduction part 15. The insulation coating 11 is scraped in the scrape part 16. By reaching the fix part 17, the electric wire 8 is fixed in a sandwiched state. As a result, the part of the electric wire 8 in which the conductor 10 is exposed contacts the inner surface of the fix part 17. Thus, the electric wire 8 is fixed and electrically connected to the insulation-displacement terminal 9. As shown in FIG. 5, the insulation-displacement terminal 9 that fixes the electric wire 8 is fixed by the holder portion 18.

When the electric wire 8 passes through the scrape part 16, the insulation coating 11 is scraped and a part of the conductor 10 is also slightly scraped. In this case, there is a possibility that a part of the conductor 10 (metal chip) scraped from the electric wire 8 becomes a cut piece, and the cut piece separates from the electric wire 8 and falls on a peripheral electric circuit. In the present embodiment, as shown in FIG. 4A, the thickness of the contact portion 16a on the inner surface of the scrape part 16 gradually increases toward the second direction. As shown in FIG. 4B, as the electric wire 8 relatively advances along the scrape part 16 toward the second direction, the width of the conductor 10 to be scraped gradually increases, so that the metal chip (the cut piece 10a) widens in the third direction.

Thus, since the size of the part of the cut piece 10a connected to the electric wire 8 (conductor 10) gradually increases, the cut piece 10a becomes difficult to be separated from the electric wire 8 and be peeled off from the wire 8. As a result, according to the present embodiment, the electric wire 8 is electrically connected to the insulation-displacement terminal 9. When the electric wire 8 is fixed into the slot 12 of the insulation-displacement terminal 9, the configuration can effectively reduce the separation and falling of a part of the conductor 10.

In particular, in the present embodiment, the edge portion L1 on the rear surface of the contact portion 16a extends linearly and is aligned with the rear surface of the insulation-displacement terminal 9 in the first direction. As a result, the cut piece 10a is generated by scraping the electric wire 8 on one side of the connection unit 16a which is inclined. Accordingly, a part of the cut piece 10a connected to the electric wire 8 can be secured in a large state. Thus, the cut piece 10a is less likely to be separated from the conductor 10.

In the present embodiment, the edge portion L1 of the scrape part 16 extends linearly. Each of the two beams 13, 14 includes the edge portion L1 at the same side in the third direction. As a result, the cut piece 10a scraped by the scrape part 16 is formed in the same direction on both sides of the slot 12. In the present embodiment, the edge portion L1 on the rear surface of the contact portion 16a and the edge portion L3 of the fix part 17 continuously connected to the edge portion L1 are arranged to extend in a straight line. As the electric wire 8 relatively advances to the fix part 17 through the scrape part 16 along the second direction, the conductor 10 continues to be in contact with the inner surfaces of the beams 13, 14. Thus, the electric wire 8 can be fixed to the fix part 17 with low contact resistance.

Second Embodiment

Figure 6A:
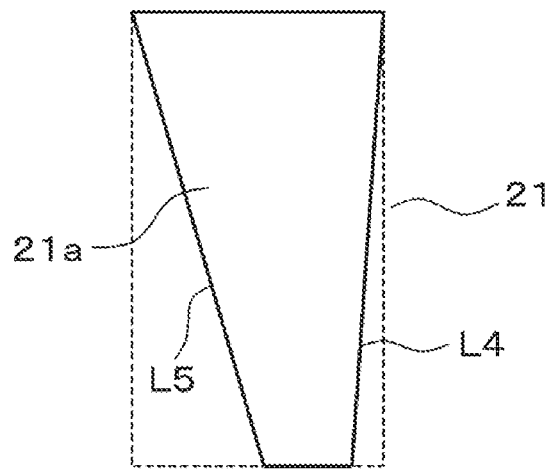
FIG. 6A is a side view showing a scrape part according to a second embodiment in one beam portion.
Figure 6B:
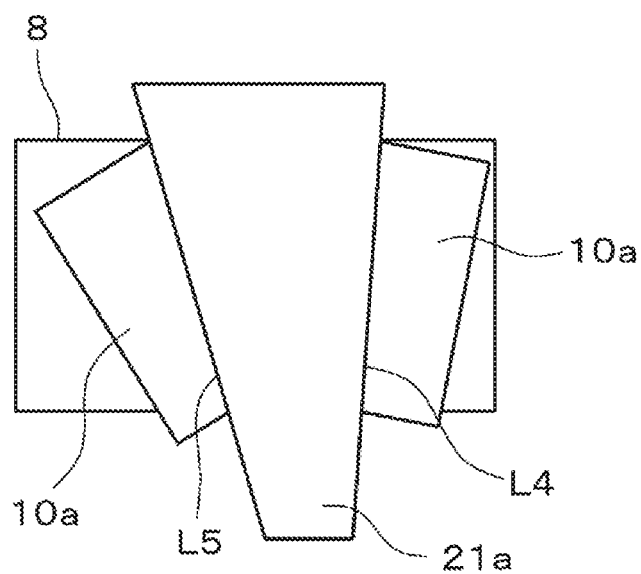
FIG. 6B is a diagram showing the scrape part generating a cut piece.

FIGS. 6A and 6B show a second embodiment. The second embodiment is different from the first embodiment in a configuration of a scrape part 21 of an insulation-displacement terminal. Although not shown in detail, the insulation-displacement terminal includes a slot 12 formed by the left and right beams 13, 14. The slot 12 includes the introduction part 15, the scrape part 21, and the fix part 17 in this order along a direction from the opening of the slot 12 to the innermost. The introduction part 15 has a wide shape in the first direction, and guides the electric wire 8. The scrape part 21 scrapes the insulation coating 11 of the electric wire 8. The fix part 17 fixes the electric wire 8. Each beam 13, 14 has the scrape part 21. Each scrape part 21 is provided in parallel.

The scrape part 21 includes a contact portion 21a to be in contact with the electric wire 8. In the third direction, the thickness of the contact portion 21a is gradually increased toward the second direction (upward in FIGS. 6A and 6B). In the present embodiment, the contact portion 21a has an edge portion L4 on the rear surface of the insulation-displacement terminal and an edge portion L5 on the front surface in the third direction. The edge portion L4 is also referred to as a first edge. The edge portion L5 is also referred to as a second edge. The edge portion L4 and the edge portion L5 are respectively inclined with respect to the rear and front surfaces of the insulation-displacement terminal. The edge portion L4 and the edge portion L5 linearly extend. The edge portion L4 and the edge portion L5 are unaligned to the surfaces of the insulation-displacement terminal. The edge portion L5 on the front side has a slightly larger inclination angle than the edge portion L4 on the rear surface.

In the second embodiment, as shown in FIG. 6B, the cut piece 10a of the conductor 10 that is generated when the electric wire 8 is scraped by the scrape part 21 is formed on the both sides in the third direction of the contact portion 21a. In this case, as the electric wire 8 relatively advances through the scrape part 21 along the second direction, the width of the conductor 10 to be scraped gradually increases, so that the metal chip (each cut piece 10a) widens in the third direction. Thus, the cut piece 10a is less likely to be separated from the electric wire 8. It is possible to effectively reduce the separation and falling of a part of the conductor 10. In addition, the size of each cut piece 10a can be reduced, and separation and falling as a large cut piece can be reduced.

Third Embodiment

Figure 7:
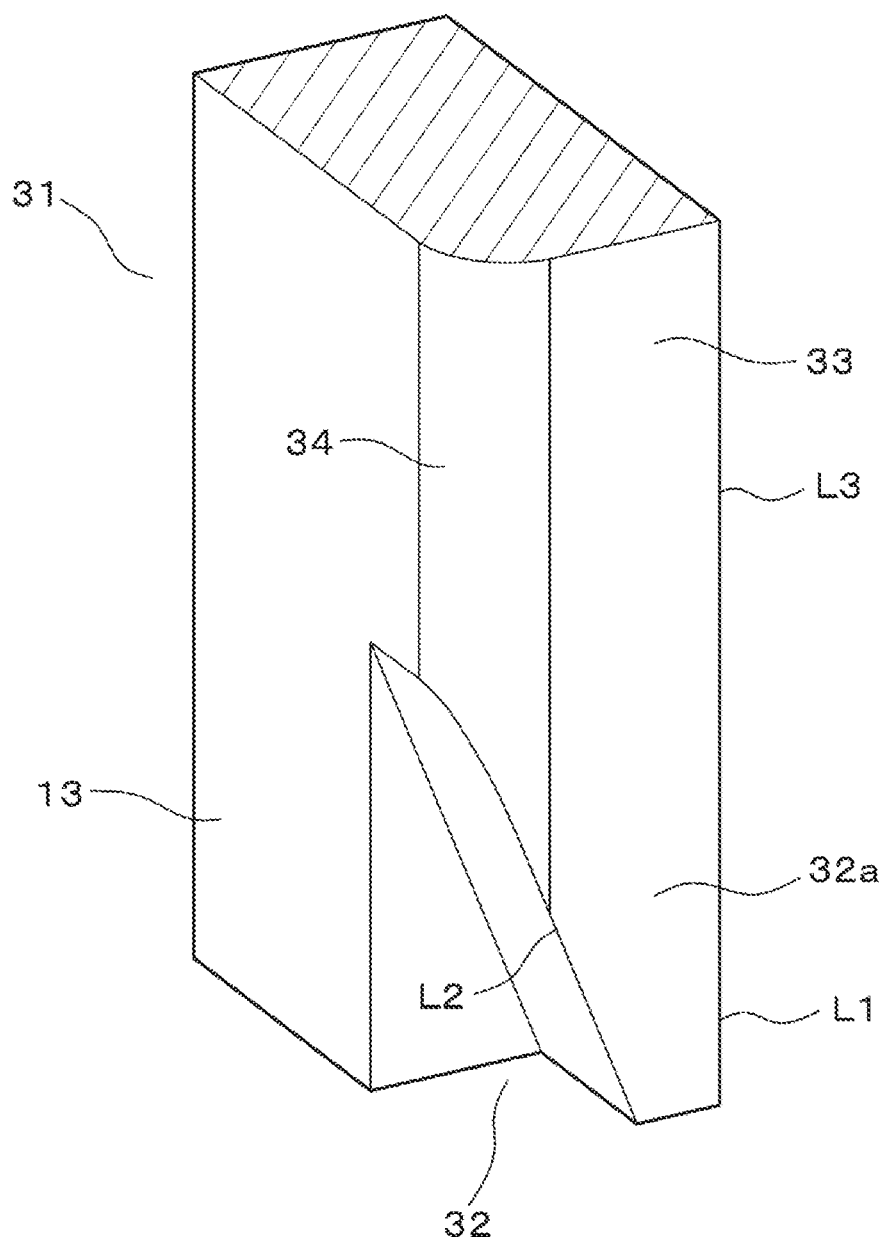
FIG. 7 shows a third embodiment, and is a perspective view showing a scrape part and a fix part in one beam portion.
Figure 8A:
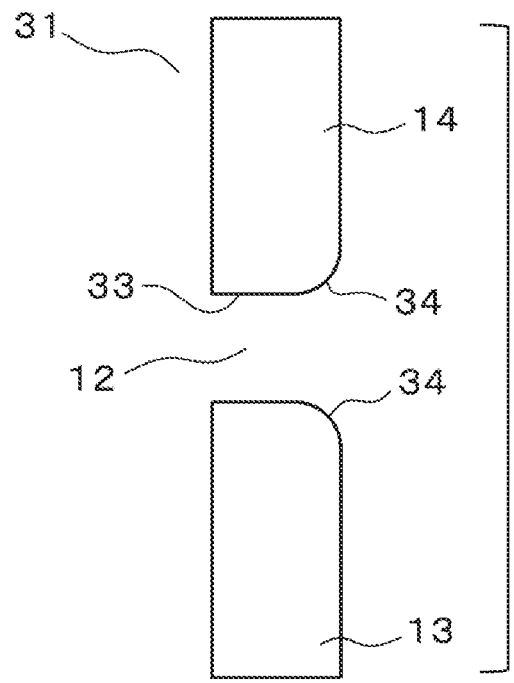
FIG. 8A is a sectional view schematically showing a contact portion and a rounded portion in both beams.
Figure 8B:
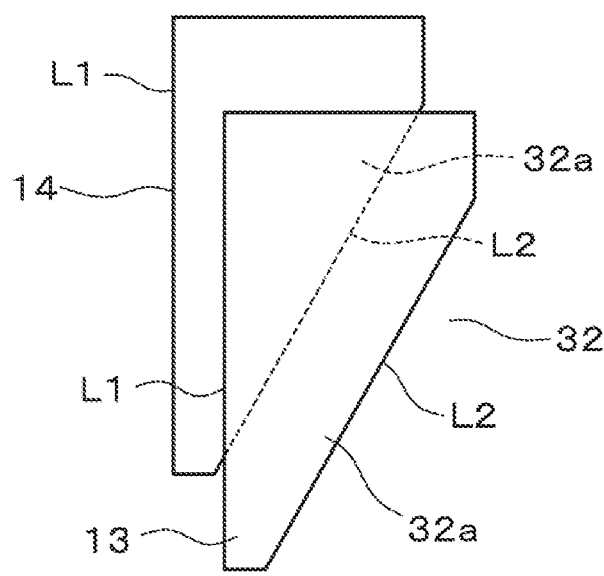
FIG. 8B is a perspective view schematically showing the contact portion and the rounded portion in both beams.
Figure 9:
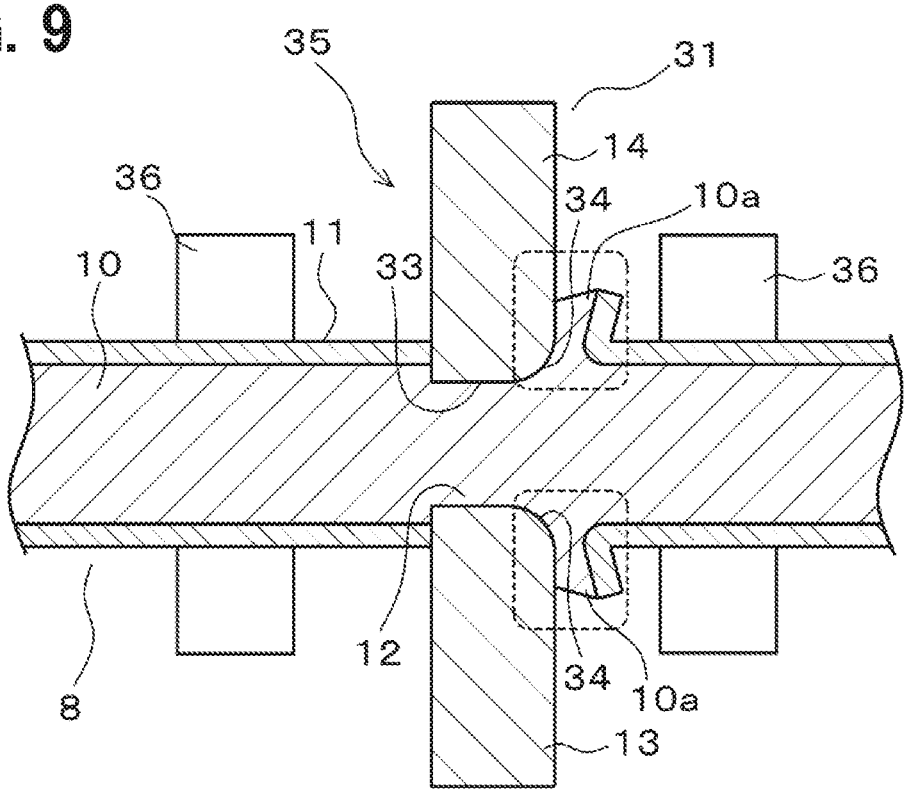
FIG. 9 is a cross-sectional view showing a connection unit generating a cut piece.

FIGS. 7 to 9 show a third embodiment. The third embodiment is different from the first embodiment in a configuration of an insulation-displacement terminal 31. Although not shown in detail, the insulation-displacement terminal 31 includes a slot 12 formed by the left and right beams 13, 14. The slot 12 includes an introduction part, a scrape part 32, and a fix part 33 in this order along a direction from the opening of the slot 12 to the innermost. The introduction part has a wide shape in a first direction, and guides the electric wire 8. The scrape part 32 scrapes the insulation coating 11 of the electric wire 8. The fix part 33 fixes the electric wire 8. Each beam 13, 14 includes the scrape part 32. Each scrape part 32 is in parallel.

As shown in FIG. 7, the scrape part 32 includes a contact portion 32a at inner surfaces of the beams 13, 14 which provide the slot 12. The contact portion 32a contacts the electric wire 8, when the electric wire 8 is inserted. In a direction of the thickness of the insulation-displacement terminal 31, the thickness of the contact portion 32a is gradually increased toward the second direction of the electric wire 8 (upward in FIG. 7). As in the first embodiment, the scrape part 32 includes the edge portion L1 on the rear surface. The edge portion L1 extends linearly and is aligned with the rear surface of the insulation-displacement terminal 31. The edge portion L1 of the contact portion 32a and a rear edge portion L3 of the fix part 33 are arranged so as to extend continuously and linearly. Further, as schematically shown in FIGS. 8A-8B, in the contact portion 32a of each of the beams 13, 14, the edge portion L1 is arranged on the same side in the third direction.

The contact portion 32a includes an edge portion L2 on an opposite side of the edge portion L1 in the third direction. In the present embodiment, as shown in FIGS. 7 to 9, a ridge, in the fix part 33 of each of the beams 13, 14, connected to the edge portion L2 is provides a rounded portion 34 to have an arcuate rounded surface. As shown in FIG. 7, the rounded portion 34 is provided over a part of the edge portion L2 of the scrape part 32. FIG. 9 shows a connection unit 35 for connecting the electric wire 8 and the insulation-displacement terminal 31. On both sides of the insulation-displacement terminal 31, support portions 36 for supporting the electric wires 8 are provided.

In the insulation-displacement terminal 31 according to the third embodiment, the thickness of the contact portion 32a on the inner surface of the scrape part 32 gradually increases toward the second direction. The edge portions L1 of the beams 13, 14 are provided on the same side in the third direction. As shown in FIG. 9, the cut piece 10a scraped by the scrape part 32 is generated in the same direction on both sides of the slot 12.

In the present embodiment similarly to the first embodiment, since the size of the part of the cut piece 10a connected to the electric wire 8 (conductor 10) gradually increases, the cut piece 10a becomes difficult to be separated from the electric wire 8 and to be peeled off from the wire 8. As a result, according to the present embodiment, it is possible to effectively reduce the separation and falling of a part of the conductor 10 of the electric wire 8.

As the electric wire 8 relatively advances to the fix part 33 through the scrape part 32 along the second direction, the cut piece 10a generated in the scrape part 32 comes into contact with the ridge of the fix part 33 and is pushed away. Since the rounded portion 34 is formed on the ridge, stress on the cut piece 10a is relaxed without being concentrated on the corner of the ridge as shown in FIG. 9. Thus, the configuration can obtain an effect that the cut piece 10a can be difficult to be separated from the electric wire 8.

Fourth and Fifth Embodiments

Figure 10A:
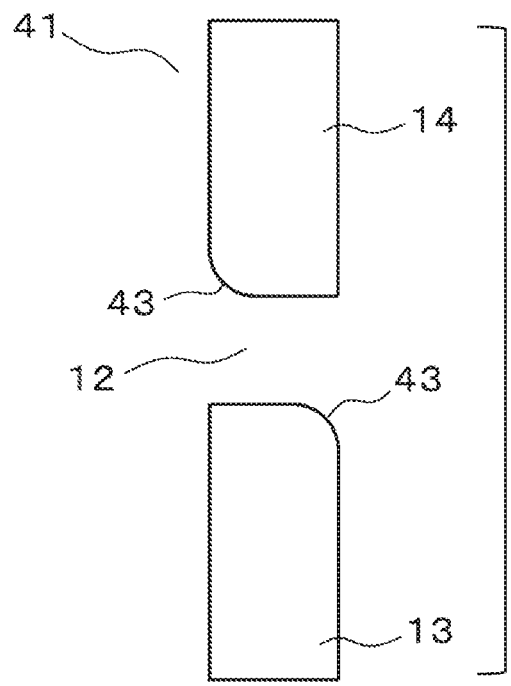
FIG. 10A shows a forth embodiment and is a sectional view schematically showing a contact portion and a rounded portion in both beams.
Figure 10B:
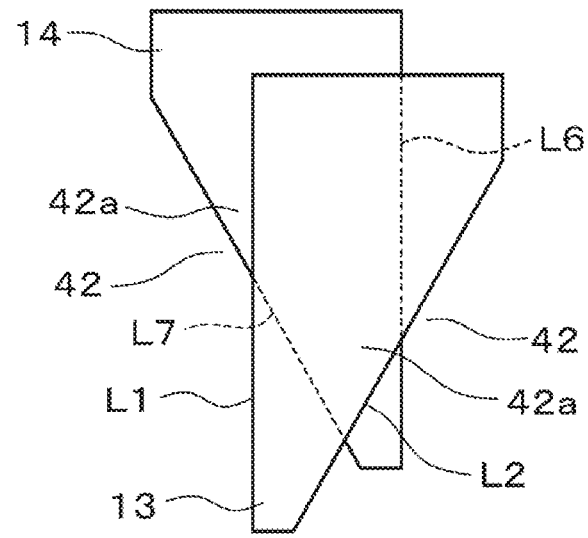
FIG. 10B is a perspective view schematically showing the contact portion and the rounded portion in both beams.

FIGS. 10A and 10B show a fourth embodiment, and the configuration of an insulation-displacement terminal 41 is different from that of the third embodiment or the like. The insulation-displacement terminal 41 has a slot 12 formed by the left and right beams 13, 14. The slot 12 includes an introduction part, a scrape part 42, and a fix part in in this order along a direction from the opening of the slot 12 to the innermost. The introduction part has a wide shape in a left-right direction, and guides the electric wire 8. The scrape part 42 scrapes the insulation coating 11 of the electric wire 8. The fix part fixes the electric wire 8. The scrape part 42 is provided in parallel. The scrape part 42 includes a contact portion 42a to be in contact with the electric wire 8. In a direction of the thickness of the insulation-displacement terminal, the thickness of the contact portion 42a is gradually increased toward the second direction of the electric wire 8.

In the present embodiment, for example, in the left side beam portion 13, the edge portion L1 on the rear surface of the contact portion 42a is aligned with the rear surface of the insulation-displacement terminal 41 and is continuously and linearly connected to the rear surface of the fix part. In the left side beam portion 13, the edge portion L2 on the front surface of the contact portion 42a extends linearly and has an inclination. In addition, a rounded portion 43 is formed on a ridge of the fix part that is continuous with the edge portion L2 opposite to the edge portion L1.

On the other hand, in the left beam portion 13, on the contrary to the right beam portion 14, the edge portion L6 on the front surface of the contact portion 42a is aligned with the front surface of the insulation-displacement terminal 41 and is continuously and linearly connected to the front surface of the fix part. In the left beam portion 13, the edge portion L7 on the rear surface of the contact portion 42a extends linearly and has an inclination. A rounded portion 43 is formed on a ridge of the fix part that is continuous with the edge portion L7 opposite to the edge portion L6. In the contact portion 42a, the edge portion that linearly extends and is aligned with the front surface of the insulation-displacement terminal 41 and the edge portion that linearly extends and is aligned with the rear surface of the insulation-displacement terminal 41 are provided in opposite surfaces with each other in the third direction.

In the fourth embodiment, since the edge portions L1, L6 of the beams 13, 14 are provided on opposite surfaces in the third direction, the cut pieces 10a of the conductor 10 scraped by the scrape part 42 are generated in the opposite directions. In the present embodiment similarly to the third embodiment, since the size of the portion of the cut piece 10a connected to the electric wire 8 (conductor 10) gradually increases, the cut piece 10a becomes difficult to be separated from the electric wire 8 and to be peeled off from the wire 8. As a result, according to the present embodiment, it is possible to effectively reduce the separation and falling of a part of the conductor 10 of the electric wire 8.

In addition, since the rounded portion 43 is formed on the ridge of the fix part, stress is relaxed on the cut piece 10a generated in the scrape part 42. The configuration can obtain an effect that the cut piece 10*a* can be difficult to be separated from the electric wire 8. As a result, the cut piece 10*a* scraped by the scrape part 42 is formed in the opposite directions on both sides of the slot 12. The configuration of the present embodiment can reduce the load acting on the electric wire 8, that is, the reaction force from the cut piece 10*a* when passing through the scrape part 42. As a result, the occurrence of displacement of the electric wire 8 due to the load can be reduced.

Figure 11:
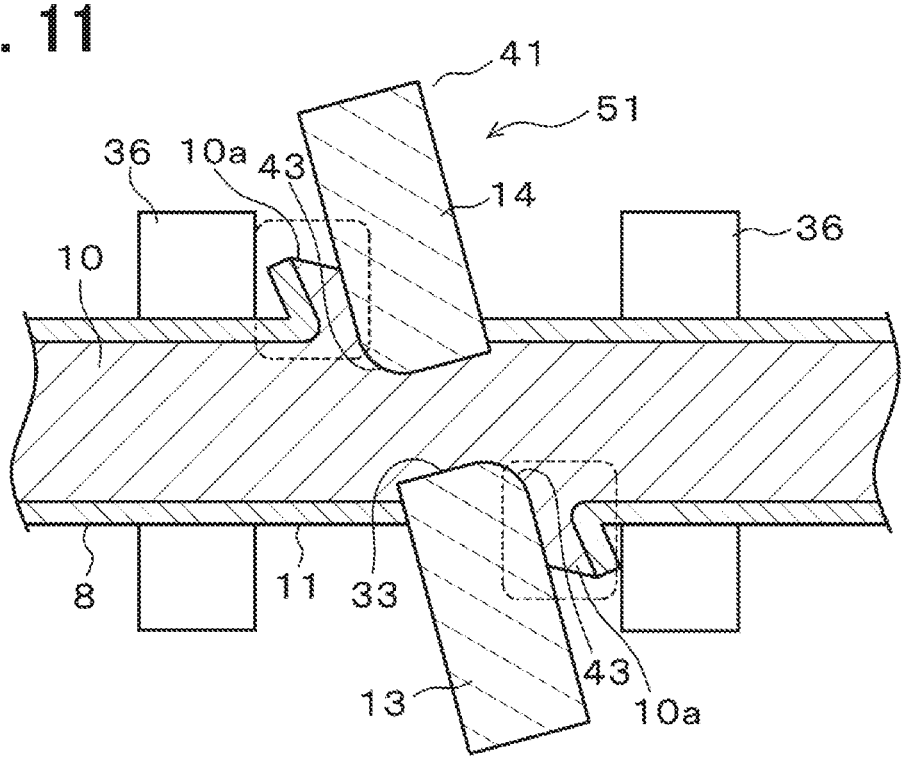
FIG. 11 shows a fifth embodiment, and is a cross-sectional view showing a connection unit.

FIG. 11 shows a fifth embodiment. In this embodiment, the insulation-displacement terminal 41 similar to that of the fourth embodiment is used. The insulation-displacement terminal 41 is arranged with an inclination with respect to the direction in which the electric wire 8 extends. The connection area between the cut piece 10*a* and the electric wire 8 is larger. Thus, the cut piece 10*a* can be more difficult to be separated.

Sixth Embodiment

Figure 12:
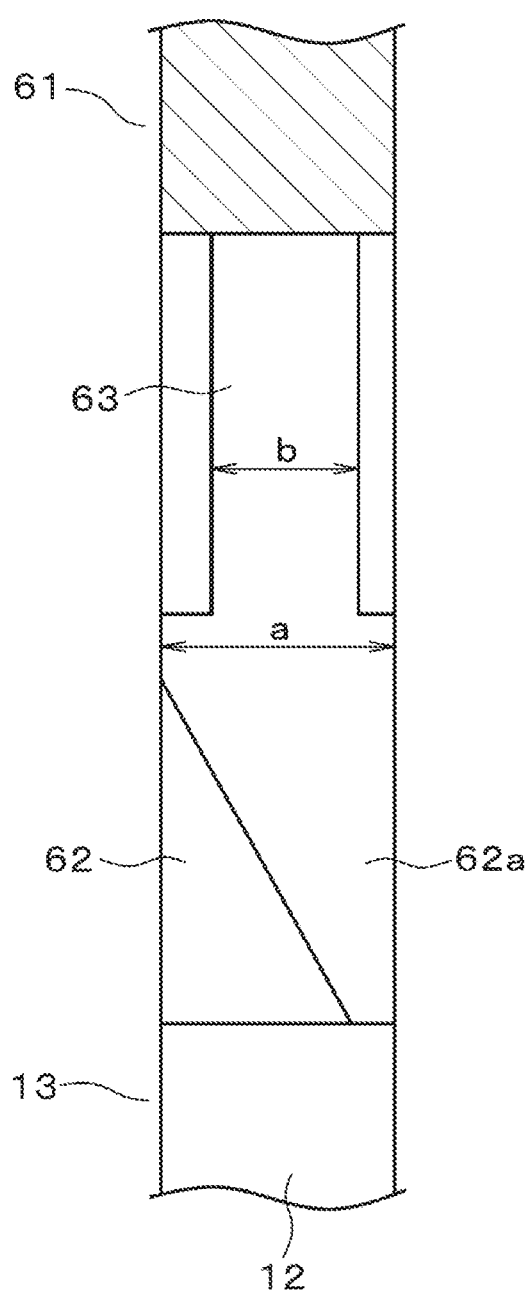
FIG. 12 shows a sixth embodiment, and is a side view of a scrape part and a fix part.

FIG. 12 shows a sixth embodiment, and the configuration of an insulation-displacement terminal 61 is different from that of the first embodiment and the like. The slot 12 of the insulation-displacement terminal 61 includes an introduction part, a scrape part 62, and a fix part 63 in this order from the opening of the slot 12 to the innermost. The introduction part has a wide shape in a left-right direction, and guides the electric wire 8. The scrape part 62 scrapes the insulation coating 11 of the electric wire 8. The fix part 63 fixes the electric wire 8. Each beam 13, 14 has the scrape part 62. Each scrape part 62 is provided in parallel. The scrape part 62 includes a contact portion 62*a* to be in contact with the electric wire 8. In a direction of the thickness of the insulation-displacement terminal 61, the thickness of the contact portion 62*a* is gradually increased toward the second direction of the electric wire 8.

In the present embodiment, in the insulation-displacement terminal 61, the width dimension b of the fix part 63 is smaller than the width dimension a of the both ends of the contact portion 62*a* in the third direction. In the sixth embodiment, as in the first embodiment and the like, the size of the part of the cut piece 10*a* connected to the electric wire 8 (conductor 10) gradually increases. Thus, it is possible to effectively reduce the separation and falling of a part of the conductor 10 of the electric wire 8. In this case, as the electric wire 8 relatively advances to the fix part 63 through the scrape part 62 along the second direction, the cut piece 10*a* generated by the scrape part 62 can be separated from the fix part 63. Thus, this configuration can reduce the separation of the cut piece 10*a*.

Seventh Embodiment and Other Embodiments

Figure 13:
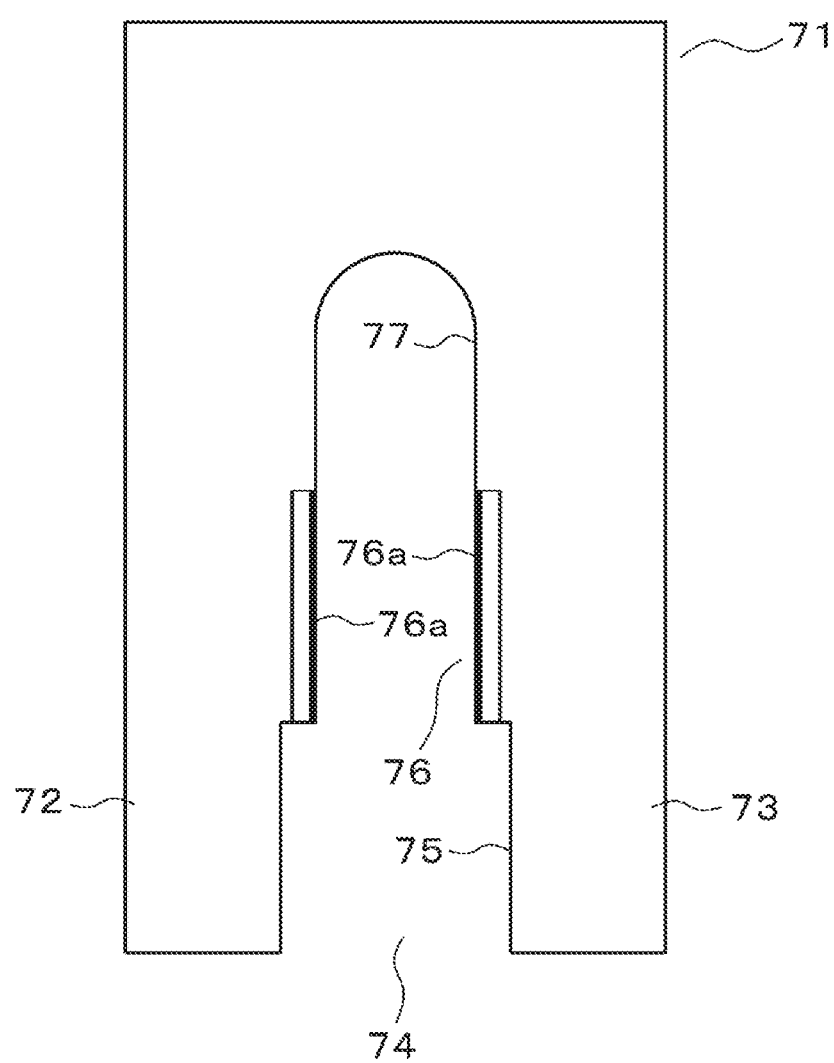
FIG. 13 shows a seventh embodiment, and is a front view of an insulation-displacement terminal.
Figure 14:
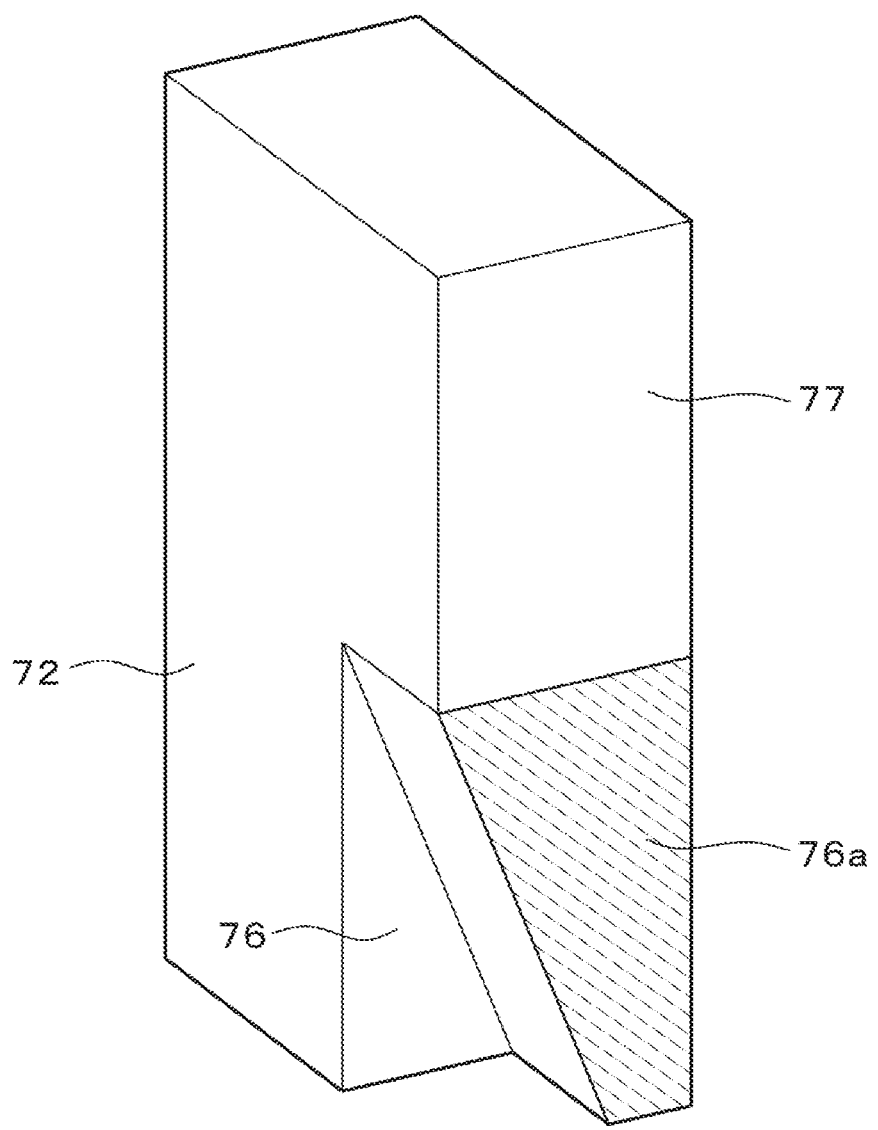
FIG. 14 is a perspective view showing a scrape part and a fix part in one beam portion.

FIGS. 13, 14 show a seventh embodiment. The seventh embodiment is different from the first embodiment in a configuration of an insulation-displacement terminal 71. The insulation-displacement terminal 71 is made of a thin plate of metal, for example, copper. The shape of the insulation-displacement terminal 71 is similar to the shape of the insulation-displacement terminal 9 of the first embodiment. The insulation-displacement terminal 71 has a slot 74 formed by beams 72, 73. The slot 74 has an introduction part 75, a scrape part 76, and a fix part 77 in this order. Each beams 72, 73 has the scrape part 76. Each scrape part 76 is provided in parallel. The scrape part 76 includes a contact portion 76*a* to be in contact with the electric wire 8. In a direction of the thickness of the insulation-displacement terminal 71, the thickness of the contact portion 76*a* is gradually increased toward the second direction of the electric wire 8.

In the present embodiment, the surface of the contact portion 76*a* is harder than the inner surface of the fix part 77. Specifically, the entire surface of the insulation-displacement terminal 71 except for the surface of the contact portion 76*a* may be subjected to a surface treatment by relatively soft plating such as nickel-tin plating. As a result, the contact portion 76*a* has a hard surface on which copper is exposed (shown by hatching in FIG. 14 for convenience). The other surface of the insulation-displacement terminal 71 has a relatively soft surface. The hard surface of the contact portion 76*a* is harder than the insulation coating 11 of the electric wire 8. Thus, the contact portion 76*a* can scrape the insulation coating 11 from the electric wire 8.

According to the seventh embodiment, as in the first embodiment, the configuration can reduce the separation and falling of a part of the conductor 10. The insulation coating 11 can be scraped by the hard portion of the contact portion 76*a*. Thus, the fix part 77 comes into contact with the electric wire 8 on a soft surface, thereby reducing the contact resistance. Alternatively, the entire insulation-displacement terminal 71 may be made of a relatively soft material, and the surface of the contact portion 76*a* may be plated with a hard metal to provide a hard surface.

The present disclosure is not limited to the above embodiments. For example, various changes can be made to the entire shape of the insulation-displacement terminal and the shape of the slot. Further, regarding the scrape part, the contact portion, the fix part, and the like, a configuration in which the plurality of embodiments described above are appropriately combined may be adopted. Also, the application of the electronic device is applicable not only to the in-vehicle motor, but also to the general electrical connection of electric wires of various devices.

Although the present disclosure has been described in accordance with the examples, it is understood that the disclosure is not limited to such examples or structures. The present disclosure encompasses various modifications and variations within the scope of equivalents. Furthermore, various combination and formation, and other combination and formation including one, more than one or less than one element may be made in the present disclosure.

What is claimed is:

1. An electronic device comprising:
   a connection unit that includes
   an electric wire that includes a conductor and an insulation coating on an outer periphery of the conductor, and
   an insulation-displacement terminal that includes two beams facing each other in a first direction to define a slot between the two beams, and receives the electric wire in the slot to have an electrical connection, wherein:
   the insulation-displacement terminal includes an introduction part defining an opening of the slot, a scrape part for scraping the insulation coating from the electric wire, and a fix part fixing the electric wire in order along a second direction from the opening to an innermost part of the slot;
   a dimension of the slot in the first direction is greater at the introduction part than the scrape part and the fix part;

the scrape part includes a contact portion on an inner surface of each of the two beams and to be in contact with the electric wire when the electric wire is inserted into the slot;

the contact portion has a dimension in a third direction, which intersects with the first and second directions, the dimension in the third direction gradually increasing in the second direction toward the innermost part of the slot, wherein the contact portion has a first edge that is aligned with one of surfaces of the insulation-displacement terminal in the third direction and extends linearly, the contact portion has a second edge on an opposite side of the first edge in the third direction;

the fix part has a ridge in each of the two beams; and the ridge is connected to the second edge and is rounded.

2. The electronic device according to claim 1, wherein the scrape part is provided in each of the two beams, and the scrape parts are in parallel.

3. The electronic device according to claim 1, wherein the first edge is provided in each of the two beams on a same side in the third direction.

4. The electronic device according to claim 1, wherein: the first edge is provided in each of the two beams, and the first edges of the two beams are provided on different sides in the third direction.

5. The electronic device according to claim 4, wherein the insulation-displacement terminal is arranged with an inclination with respect to a direction in which the electric wire extends.

6. The electronic device according to claim 1, wherein: in the third direction, the contact portion has a first edge on one side and a second edge on another side; and one of the first edge and the second edge linearly extends to an edge of the fix part.

7. The electronic device according to claim 1, wherein, in the third direction, the fix part has a dimension smaller than a dimension of the contact portion.

8. The electronic device according to claim 1, wherein the contact portion has a surface harder than a surface of the fix part.

9. An insulation-displacement terminal that configures, together with an electric wire, a connection unit of an electronic device, the electric wire including a conductor and an insulation coating on an outer periphery of the conductor, the insulation-displacement terminal comprising:

two beams that faces each other in a first direction to define a slot between the two beams, and is configured to receive the electric wire in the slot to have an electrical connection;

an introduction part that defines an opening of the slot;

a scrape part configured to scrape the insulation coating from the electric wire; and a fix part configured to fix the electric wire, wherein the introduction part, the scrape part, and the fix part are arranged in order along a second direction from the opening to an innermost part of the slot;

a dimension of the slot in the first direction is greater at the introduction part than the scrape part and the fix part;

the scrape part includes a contact portion on an inner surface of each of the two beams and to be in contact with the electric wire when the electric wire is inserted into the slot; the contact portion has a dimension in a third direction, which intersects with the first and second directions, the dimension in the third direction gradually increasing in the second direction toward the innermost part of the slot, the contact portion has a first edge that is aligned with one of surfaces of the two beams in the third direction and extends linearly, the contact portion has a second edge on an opposite side of the first edge in the third direction;

the fix part has a ridge in each of the two beams; and the ridge is connected to the second edge and is rounded.

10. The insulation-displacement terminal according to claim 9, wherein the scrape part is provided in each of the two beams, and the scrape parts are in parallel.

* * * * *